United States Patent [19]

Yamakawa

[11] Patent Number: 4,780,865
[45] Date of Patent: Oct. 25, 1988

[54] OPTICAL INFORMATION REPRODUCING APPARATUS WITH TILT CORRECTION INCLUDING PROJECTION AND DETECTION OF A SAME DIFFUSELY ILLUMINATED FIELD

[75] Inventor: Akio Yamakawa, Kanagawa, Japan

[73] Assignee: Sony Corporation, Tokyo, Japan

[21] Appl. No.: 45,239

[22] Filed: May 4, 1987

Related U.S. Application Data

[63] Continuation of Ser. No. 634,790, Jul. 26, 1984, abandoned.

[30] Foreign Application Priority Data

Jul. 29, 1983 [JP] Japan .................. 58-139965
Jul. 30, 1983 [JP] Japan .................. 58-140139

[51] Int. Cl.$^4$ ............................................. G11B 7/095
[52] U.S. Cl. ........................................ 369/46; 369/44; 369/54; 369/58
[58] Field of Search ........................... 369/44-46, 369/54, 58, 106, 116, 118; 250/201 DF

[56] References Cited

U.S. PATENT DOCUMENTS

| | | | |
|---|---|---|---|
| 4,135,206 | 1/1979 | Kleuters et al. | 369/44 X |
| 4,356,392 | 10/1982 | Wittekoek et al. | 369/44 X |
| 4,374,324 | 2/1983 | Van Rosmalen et al. | 369/44 X |
| 4,425,043 | 1/1984 | Van Rosmalen | 369/45 X |
| 4,494,154 | 1/1985 | Akiyama | 369/44 X |
| 4,502,134 | 2/1985 | Kondo et al. | 369/46 |
| 4,555,780 | 11/1985 | Koide | 369/44 X |
| 4,561,081 | 12/1985 | Janssen et al. | 369/46 X |
| 4,562,565 | 12/1985 | Tamura | 369/44 |
| 4,634,853 | 1/1987 | Kanamaru | 369/44 X |

FOREIGN PATENT DOCUMENTS

57-179954 11/1982 Japan .................. 369/54
57-186237 11/1982 Japan .
2103392 2/1983 United Kingdom .

Primary Examiner—Raymond F. Cardillo
Assistant Examiner—W. R. Young
Attorney, Agent, or Firm—Lewis H. Eslinger

[57] ABSTRACT

In an optical information reproducing apparatus for reproducing an information recorded on a recording surface of a disc-shaped record medium and which includes an optical pick up device mounted on a tiltable optical block and having a laser beam source for generating a laser beam and a photo detector for detecting the reflected beam from the recording surface and for reading the recorded information, a skew error detector mounted on the tiltable optical block for detecting skewing of the record medium and a skew error corrector controlled by the output of the skew error detector for controlling the optical block so that an optical axis of the pick up device is maintained perpendicular to the recording surface; the skew error detector includes diffused light source, a divided photo detector and a lens, the light source and the divided photo detector being arranged symmetrically with respect to an axis parallel with the optical axis of the optical pick up device, the light irradiated from the diffused light source and reflected from the recording surface being directed to the divided photo detector through the lens such that a real image of the diffused light source is formed on the divided photo detector, and the difference between the amounts of light detected by respective areas of the divided photo detector corresponding to the skew error output of the skew error detector.

7 Claims, 9 Drawing Sheets

OPTICAL INFORMATION REPRODUCING APPARATUS WITH TILT CORRECTION INCLUDING PROJECTION AND DETECTION OF A SAME DIFFUSELY ILLUMINATED FIELD

This is a continuation of application Ser. No. 634,790, filed July 26, 1984, now abandoned.

BACKGROUND OF THE INVENTION

1. Field of the Invention

The present invention generally relates to optical information reproducing apparatus and more particularly is directed to an optical information reproducing apparatus for reproducing information recorded on a recording surface of an optical disc such as an optical video disc, a so-called compact disc and so on.

2. Description of the Prior Art

Generally, in an optical disc reproducing apparatus, a laser beam is focussed on the recording surface of an optical disc by an objective lens so as to reproduce a signal recorded thereon. In this case, the resolution of the reproducing apparatus is determined by how much the laser beam is converged, that is, by the diameter of the beam spot on the recording surface so that the maximum value of the diameter of beam spot is selected to be less than a certain value. The diameter of the beam spot is determined by the wavelength of the laser light and the ratio between the focal length of an objective lens and its diameter (this ratio is generally presented as an NA (numerical aperture) value) and so on.

By the way, in the art, a helium-neon laser has been used as a light source. This helium-neon laser, however, causes the apparatus to be large in size and expensive. Accordingly, it is a recent trend that a semiconductor laser is used as the light source because it is inexpensive and suitable for making the apparatus compact in size.

However, the semiconductor laser provides light with a wavelength of 780 nm which is longer than the wavelength (623.8 nm) of the helium-neon laser. For this reason, in order to establish a spot diameter of the semiconductor laser which can provide the reproducing apparatus with the same resolution as that using the helium-neon laser as its light source, the NA value of the objective lens must be increased to, for example, about 0.5.

However, if the NA value of the objective lens is increased as described above, when the optical axis of the laser beam is not perpendicular to the recording surface of the disc, crosstalk components from adjacent tracks on the disc become a serious problem.

Figure 1A:
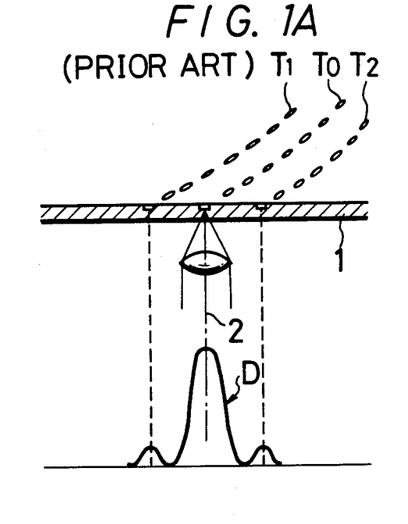
FIGS. 1A and 1B show diagrams to which reference is made in explaining the bad influence of a skew of a disc on crosstalk.
Figure 1B:
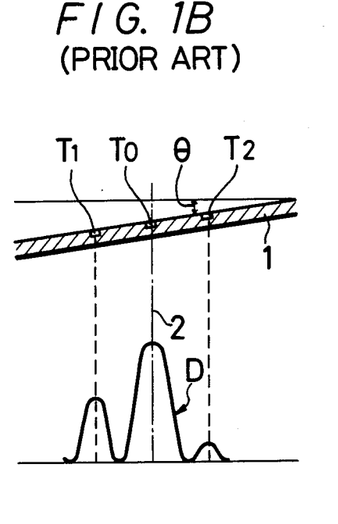

As shown in FIG. 1A, when an optical axis 2 of a laser beam is perpendicular to the recording surface of a disc 1, a detected output D in its light receiving section or photodetector becomes as shown in FIG. 1A in which crosstalk components from adjacent tracks $T_1$ and $T_2$ are small enough relative to the output from a main track $T_0$. However, as shown in FIG. 1B, when the optical axis 2 of the laser beam is not perpendicular to the recording surface of the disc 1 (this condition will hereinafter be referred to as the skew of the disc 1), the crosstalk components from one of the adjacent tracks $T_1$ and $T_2$, in this case, the crosstalk component from the track $T_1$ in the detected output D, becomes large.

When the NA value becomes large, a crosstalk level Lc can not be neglected as will be clear from the relation expressed as $$Lc \propto Wcm \propto (NA^3/\lambda) \cdot \theta$$

where Wcm is coma aberration, $\lambda$ is the wavelength of the laser beam and $\theta$ is a skew angle in the radial direction of the disc. For example, under the conditions that $\lambda$ is 780 nm, a track pitch is 1.67 $\mu$m and NA is 0.5, in order to establish the crosstalk level Lc = $-40$ dB, the condition of $\theta \leq 0.5$ has to be satisfied.

The skew of the disc, that is, the lock of perpendicularity of the optical axis of the laser bean relative to the recording surface of the disc, may be caused by the tilting or bending of a spindle shaft, the tilting or bending of a turntable for the disc, the skew or warping of the disc itself and so on. The main cause is the skew of the disc itself, and at present a skew angle $\theta$ in the radial direction of the disc of $1° \leq \theta \leq 2°$. For this reason, when the semiconductor laser is used as the light source, it is necessary to detect the overall skew of the disc in the radial direction thereof from all causes (including skews other than the skew of the disc itself) and to cope with the resulting increase of crosstalk components. The term "skew" as used hereinafter will mean skew from all causes.

In order to cope with the increase of crosstalk components, there have been previously proposed the following methods.

Figure 2:
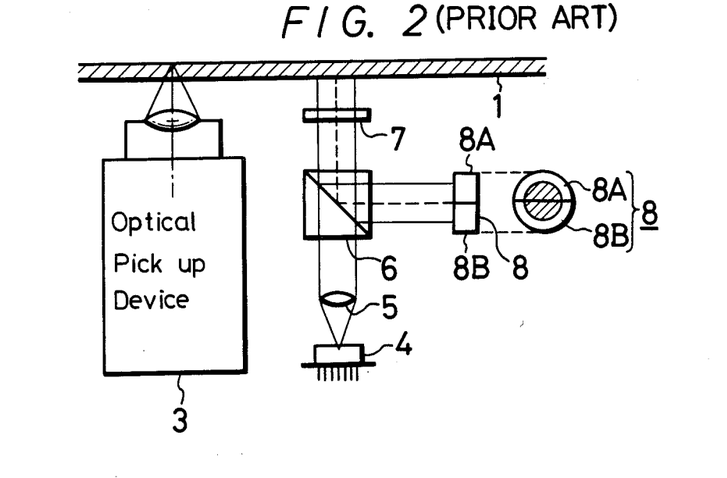
FIG. 2 is a diagram showing an example of a previously proposed skew detector.

In one of such prior art methods, as shown in FIG. 2, in addition to a laser light source included in an optical pick up device 3, a laser 4 is provided as a light source for a skew detector. A bundle of light from this laser 4 is made incident on a disc 1 as a beam of parallel light through a collimator lens 5, a polarizing beam splitter (PBS) 6 and a ¼ wavelength plate 7 and then reflected from disc 1. The reflected light is returned through the ¼ wavelength plate 7 and the PBS 6 to a photo detector 8 which is divided into two areas 8A and 8B. In this case, the skew of the disc 1 is detected as the difference between the detected outputs from divided areas 8A and 8B of the divided photo detector 8.

However, this method requires not only the laser 4 as its light source but also the collimator lens 5, the PBS 6 and the ¼ wavelength plate 7 so that this method is inherently costly. Moreover, since this method uses a beam of parallel light, at the position where the content of the recorded information on the disc 1 is changed or at the position where, in case of the recorded information being, for example, a video signal, the content of the picture is changed, the reflectivity of the disc is changed and, as a result, skew of the disc 1 is erroneously detected.

OBJECTS AND SUMMARY OF THE INVENTION

Accordingly, it is an object of the present invention to provide an improved optical information reproducing apparatus for reproducing information recorded on a recording surface of a disc-shaped record medium.

It is another object of the present invention to provide an optical information reproducing apparatus using a disc skew detector which comprises few parts and is of low cost.

It is a further object of the present invention to provide an optical information reproducing apparatus using a disc skew detector which does not detect erroneously, as a skew of the disc, a change in the content of the information recorded on the disc.

It is a still further object of the present invention to provide an optical information reproducing apparatus having a disc skew detector which does not require a laser, polarized beam splitter, a ¼ wavelength plate, a collimator lens and so on.

It is yet another object of the present invention to provide an optical information reproducing apparatus having a disc skew detector in which instead of a beam of parallel light, a diffused light is used, the source of this diffused light is positioned in the focal plane of a lens which at a far field portion thereof, faces the disc, and light reflected from the disc is focused through the lens, so that when information recorded on the disc is, for example, a video signal, even if the content of the picture is changed, such changed content of picture can not be erroneously detected as a skew of the disc.

According to one aspect of the present invention, in an optical information reproducing apparatus for reproducing information recorded on a recording surface of a disc shape record medium comprising:

an optical pick up device mounted on a tiltable optical block and having a laser beam source for generating a laser beam which is directed along an optical axis to the recording surface and a photo detector for detecting the reflected beam from said recording surface and for reading the recorded information;

a skew error detector mounted on said tiltable optical block for detecting a skew of the record medium; and a skew error corrector controlled by the output of said skew error detector and for controlling said optical block so that the optical axis of said pick up device is maintained perpendicular to the recording surface:

said skew error detector includes a diffused light source, a divided photo detector and a lens, said diffused light source and said divided photo detector are arranged symmetrically with respect to an axis parallel with the optical axis of said optical pick up device, light irradiated from said light source and reflected from the recording surface is directed to said divided photo detector through said lens such that a real image of said diffused light source is formed on said divided photo detector, and the difference between the amounts of light detected by areas of said divided photo detector corresponds to the skew error output of said skew error detector.

The above, and other objects, features and advantages of the present invention, will become apparent from the following description taken in conjunction with the accompanying drawings throughout which the same reference numerals are used to designate the corresponding elements and parts.

DESCRIPTION OF THE PREFERRED EMBODIMENTS

A first embodiment of an optical information reproducing apparatus according to the present invention will hereinafter be described with reference to FIGS. 3 to 5 of the drawings.

Figure 3:
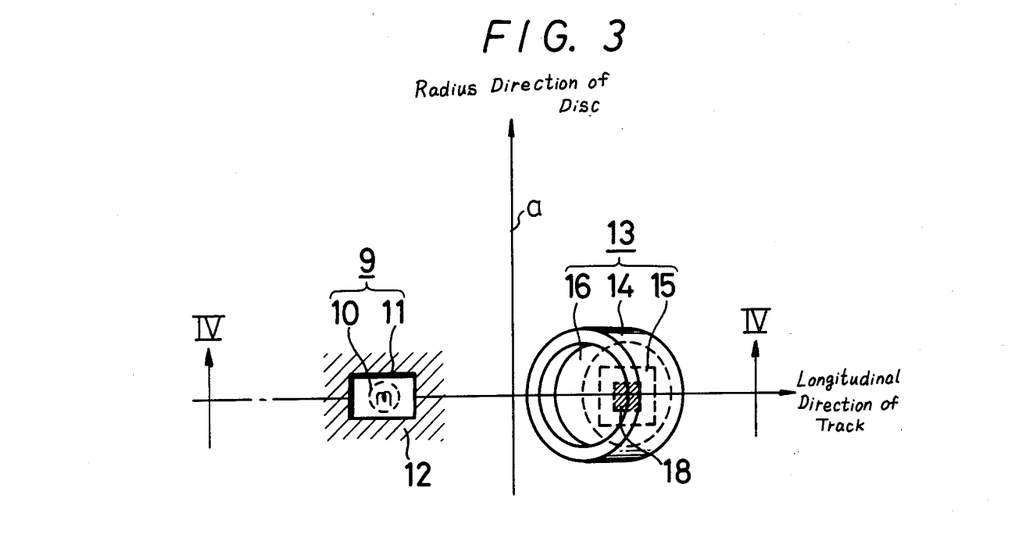
FIG. 3 is a diagrammatic top plan view of the main parts of an example of a skew detector according to the present invention, and which is shown with the disc removed.
Figure 4:
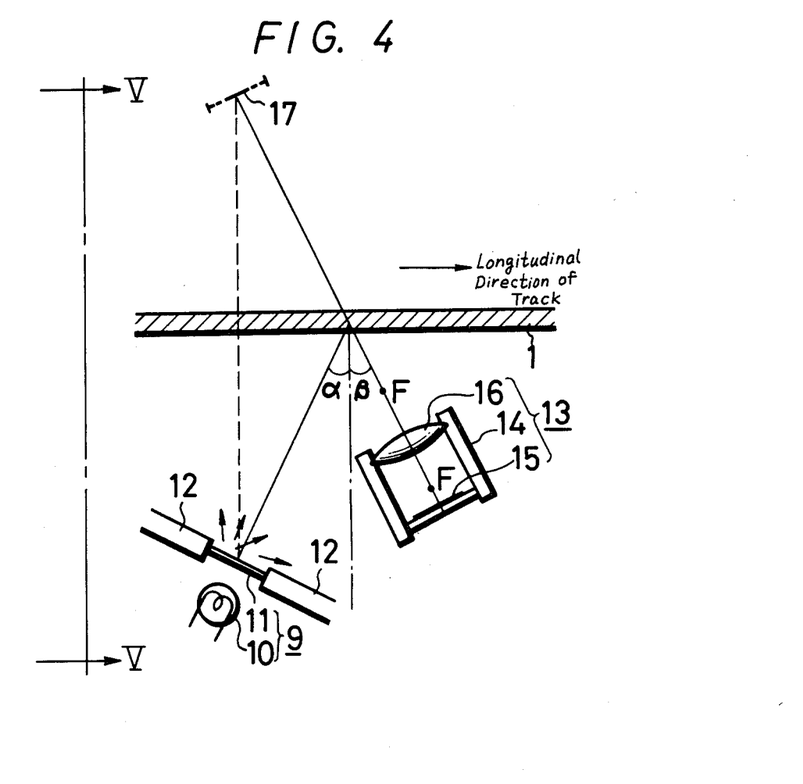
FIG. 4 is a diagrammatic elevational view of the skew detector of FIG. 3 as viewed in the direction of the arrow IV—IV thereon.
Figure 5:
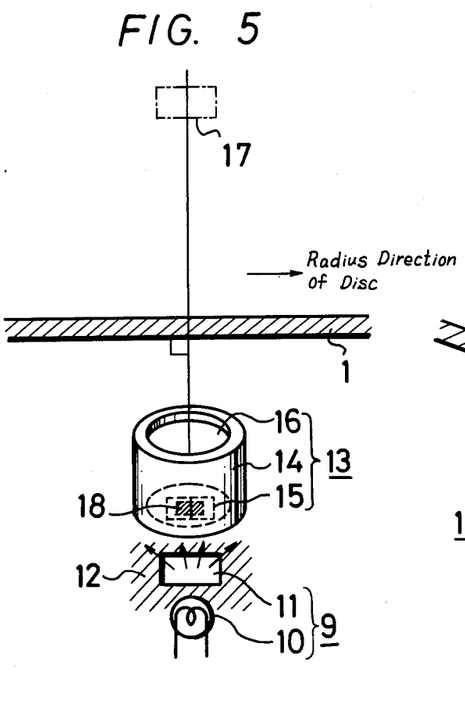
FIG. 5 is a diagrammatic elevational view of the skew detector as viewed in the direction of the arrows V—V on FIG. 4.

In accordance with the present invention, a diffused light source is used as the light source, and in the example shown in FIGS. 3 to 5, the diffused light source 9 is formed of a lamp 10 and a diffused plate 11 providing a diffusely illuminated field. In this case, the diffusing plate 11 is formed as a window of quadrilateral shape and the periphery of this window is masked by a light shielding portion 12.

Further, there is provided a light receiving device 13 which receives the light which is emitted from the diffused light source 9 and reflected by the disc 1. In this example, the light receiving device 13 consists of a cylindrical member 14, a divided photo detector 15 disposed at its bottom portion and a condenser lens 16 supported by the cylindrical member 14 between the photo detector 15 and the recording surface of the disc 1.

The diffused light source 9 and the light receiving device 13 are spaced apart in the direction perpendicular to the direction in which the skew of the disc 1 is to be detected. In this example, since the skew of the disc 1 in its radial direction is to be detected, the diffused light source 9 and the light receiving device 13 are spaced apart in the direction perpendicular to the radial direction of the disc 1 indicated by the arrow a on FIG. 3. Further, diffused light source 9 and the light receiving device 13 are disposed so that, when the optical axis of an optical pick up device (not shown) is perpendicular to the recording surface of the disc 1, the optical axis of the light receiving device 13 and the direction (hereinafter called the optical axis of the diffused light source 9) perpendicular to the diffusion plate 11 are both contained in a plane perpendicular to the recording surface. Also, the optical axes of light receiving device 13 and of the diffused light source 9 intersect with each other at the recording surface of disc 1 and, the diffused light source 9 and the light recieving device 13 are symmetrically disposed with respect to the direction (the direction parallel to the optical axis of the optical pick up device) vertical to the recording surface at the point of intersection of their optical axes. In other words, as shown in FIG. 4, the diffused light source 9 and the light receiving device 13 are disposed such that equal angles $\alpha$ and $\beta$ are formed between such vertical axis and the direction perpendicular to the recording surface of the disc 1 at the intersection of the optical axes.

The direction of the dividing of the divided photo detector 15 is made coincident with the direction perpendicular to the radial direction of the disc 1.

In FIG. 4, reference letter F designates a position of the focus of the condenser lens 16, and the positional relation of the condenser lens 16, the photo detector 15 and the diffused light source 9 is set so as to focus a real image 18 of the diffused light source 9 on the photo detector 15.

Thus, a virtual image of the diffused light source 9 is formed at the position indicated by reference numeral 17 in FIGS. 4 and 5, while the real image 18 of the diffused light source 9 is focussed on the photo detector 15 as shown by the hatched area in each of FIGS. 3 and 5.

Figure 7A:
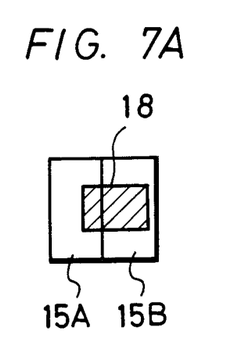
FIGS. 7A to 7C are diagrams to which reference will be made in explaining the operation of the skew detector of FIGS. 3–6.
Figure 7B:
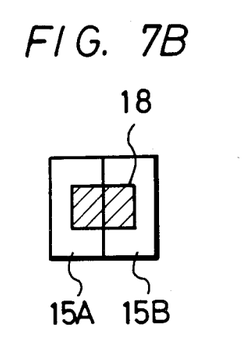

In this case, when the plane including the optical axis of the condenser lens 16 and the optical axis of the diffused light source 9 and the recording surface of the disc 1 are perpendicular to each other as shown in FIG. 5, the real image 18 of the diffused light source 9 is focussed on the divided photo detector 15 so as to equally occupy the divided areas 15A and 15B of the latter as shown in FIG. 7B. Accordingly, the photo-detected outputs from the divided areas 15A and 15B are equal to each other and hence the difference therebetween is zero.

Figure 6:
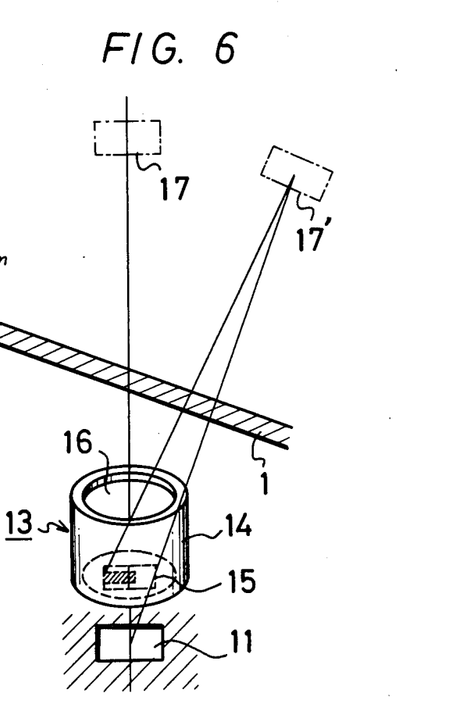
FIG. 6 is a view similar to that of FIG. 5, but with the disc skewed.
Figure 7C:
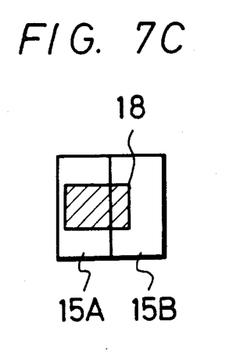

When, as shown in FIG. 6, the plane including the optical axis of the condenser lens 16 and the optical axis of the diffused light source 9 is not perpendicular to the recording surface of the disc 1 due to the skew of the disc 1, the position of the virtual image of the diffused light source 9 is displaced to a position along the direction perpendicular to the tilted disc 1, as shown at 17' in FIG. 6, so that the real image 18 of the diffused light source 9 is focussed on the photo detector 15 so as to occupy a larger amount of the area 15A than of the area 15B, as shown in FIG. 7C.

When the disc 1 is tilted in the direction opposite to that in FIG. 6, that is, when the disc 1 is skewed so that its recording surface is tilted with its left-hand side in FIG. 6 being lower, the real image 18 of the diffused light source 9 is focussed on the photo detector 15 so as to occupy a larger amount of the divided area 15B than of the divided area 15A as shown in FIG. 7A.

On the basis of the difference between the detected outputs from the respective regions 15A and 15B of the divided photo detector 15, it is possible to detect the direction and amount of the skew of the disc 1.

Figure 8:
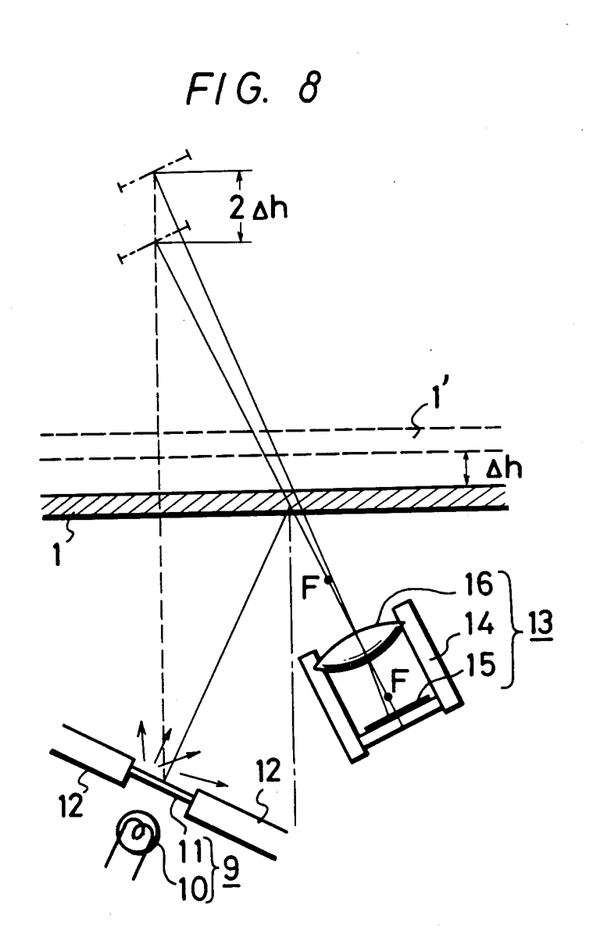
FIG. 8 is a diagrammatic elevational view similar to that of FIG. 4, but showing displacement of the disc vertically relative to the skew detector.
Figure 9A:
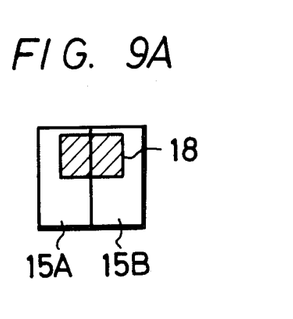
FIGS. 9A to 9C are diagrams to which reference will be made in explaining the operation of the skew detector under the circumstances shown on FIG. 8.
Figure 9B:
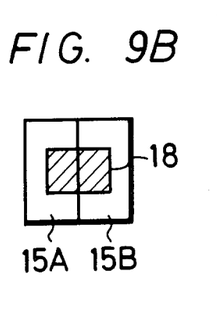
Figure 9C:
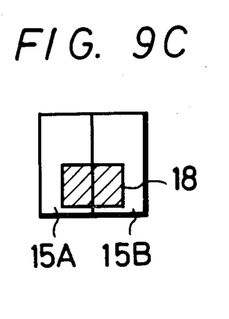

In the case where the disc 1 has no skew, but the height of the disc 1 relative to the diffused light source 9 and the light receiving device 13 is changed as shown by broken lines at 1' in FIG. 8, the real image 18 is shifted on the photo detector 15 so that it occupies equal amounts of the areas 15A and 15B but is displaced only along the direction of the dividing line between the areas 15A and 15B, as shown in FIGS. 9A, 9B and 9C. In this case, since the diffused light source 9 is used as the light source, rather than a beam of parallel light from a laser, the real image 18 is defocussed due to the change of height of the disc 1. However, the distance between the diffused light source 9 and the condenser lens 16 is larger than the distance between the condenser lens 16 and the photo detector 15 (image) so that, even if the height of the disc 1 is changed, the image 18 on the photo detector 15 is not defocussed very much.

The skew detector shown in FIGS. 3 to 5 tends to be physically large in size, so that, in practice, it may be difficult to incorporate such skew detector into the optical information reproducing apparatus.

Another embodiment of a skew detector according to this invention and, which is free of the above disadvantage will be explained with reference to FIGS. 10 to 13. The skew detector of this example can be made small in size while achieving the same effect as the first-described embodiment.

Figure 10:
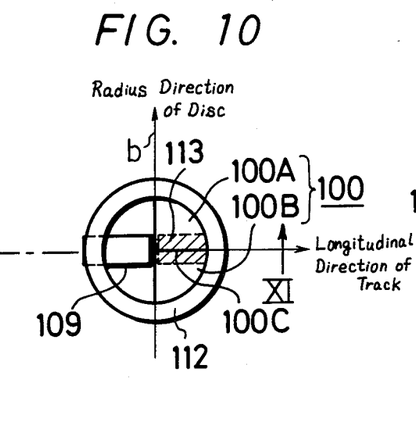
FIG. 10 is a diagrammatic top plan view of another embodiment of a skew detector according to the invention and which is shown with the disc removed.
Figure 11:
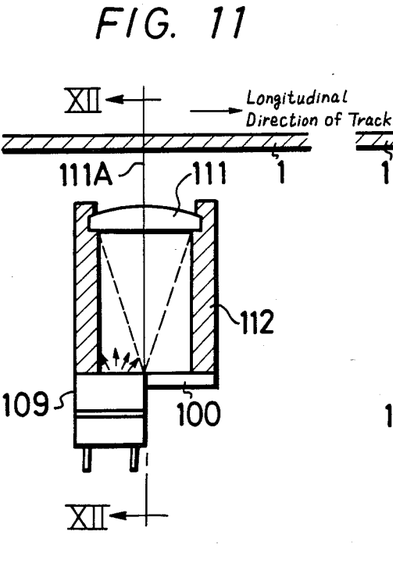
FIG. 11 is a diagrammatic sectional view along the line XI—XI on FIG. 10.
Figure 12:
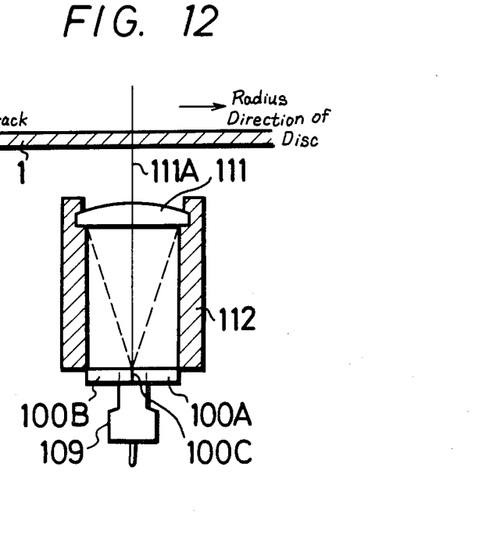
FIG. 12 is a diagrammatic sectional view along the line XII—XII on FIG. 11.

In this second embodiment a diffused light source is also used, and in the example shown in FIGS. 10 to 12 is in the form of a light emission diode 109 providing diffused light on its light emission surface. In this example, the light emission surface of the light emission diode 109 of rectangular or square shape.

Further, there is provided a photo detector 100 which receives through a lens 111 the light emitted from the light emission diode 109 and reflected by the disc 1. This photo detector 100 is a divided photo detector having two detecting areas 100 A and 100 B.

In this case, the light emission diode 109, the photo detector 100 and the lens 111 are attached to a housing member 112 formed of a cylindrical body. The lens 111 is disposed at one open end of the housing member 112, while the light emission diode 109 and the photo detector 100 are disposed at the other open end of the housing member 112 with their operative surfaces located on the focal plane of the lens 111. Moreover, diode 109 and detector 100 are separate from each other of the left- and right-hand sides of a plane including the optical axis 111A of the lens 111. Then, the housing member 112, and the light emission diode 109, the photo detector 100 and the lens 111 mounted thereon, are positioned so that the lens 111 faces toward the disc 1 and that the light emission diode 109 and the photo detector 100 are aligned in the direction perpendicular to the skew detecting or radial direction of the disc 1 indicated by the arrow b on FIG. 10. In this example, since the skew of the disc 1 in its radial direction is detected, the light emission diode 109 and the photo detector 100 are located in the direction perpendicular to the radial direction of the disc 1 as set forth just above. Moreover, in this case, the housing member 112 is so arranged that the optical aix 111A of the lens 111 is perpendicular to the recording surface of the disc 1 to which the optical axis of the optical pick up device (not shown) is also perpendicular. Further, a dividing line 100C of the divided photo detector 100 is positioned in the direction perpendicular to the skew detecting direction, namely, in the direction perpendicular to the radial direction of the disc 1. In addition, the dividing line 100C intersects the plane which includes the optical axis 111A of the lens 111.

Figure 13:
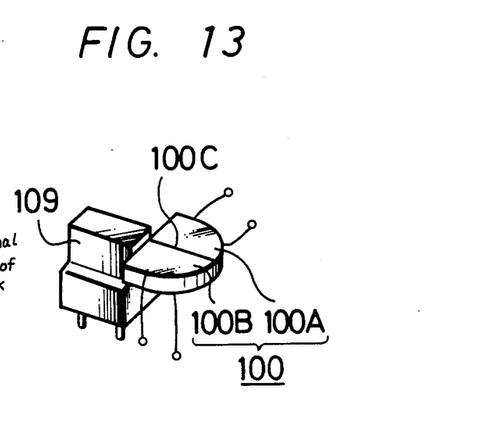
FIG. 13 is a detailed perspective view showing the light source and photo detector of the skew detector illustrated in FIGS. 10–12.

FIG. 13 is a perspective view showing only the light emission diode 109 and the divided photo detector 100.

With the arrangement thus made, a real image 113 of the surface portion of the light emission diode 109 is focussed on the photo detector 100 as indicated by the hatched area in FIG. 10. The principle of operation of the embodiment of FIGS. 10–13 will be described with reference to FIGS. 14 and 15.

Figure 14:
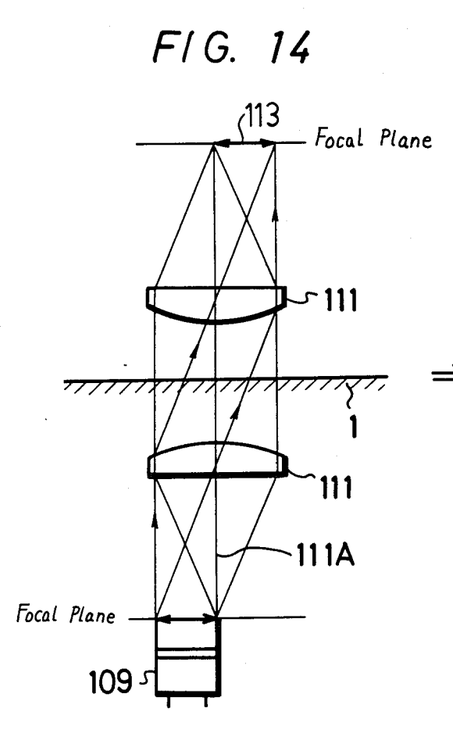
FIGS. 14–16 and FIGS. 17A to 17C are respective diagrams to which reference will be made in explaining the operation of the skew detector of FIGS. 10–13.
Figure 15:
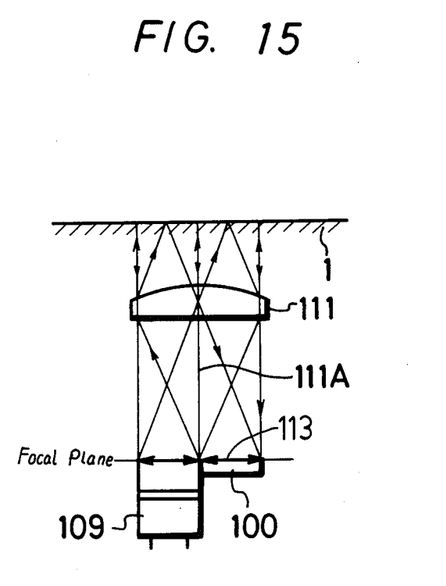

When the optical axis 111A of the lens 111 and the recording surface of the disc 1 are perpendicular to each other, the optical paths of the light incident on the recording surface of the disc 1 and of the reflected light therefrom are completely symmetrical as shown in FIG. 14. As a result, the real image of the light emitting surface of diode 109 positioned at the left-hand side of the plane including the optical axis 111A of the lens 111 and the radial direction of the disc 1 is focussed at the focal plane of the lens 111 at the right-hand side of such plane, as shown in FIG. 14. In FIG. 14, the portion of the diagram above the disc 1 represents the light reflected by the recording surface of the disc 1 so that FIG. 14 may be redrawn as shown in FIG. 15. From FIG. 15 it will be clear that the real image 13 of the light emission surface portion of the light emission diode 109 is focussed just at the position of the photo detector 100.

Figure 17A:
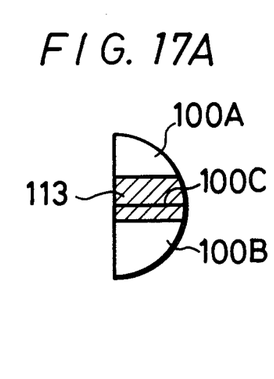
Figure 17B:
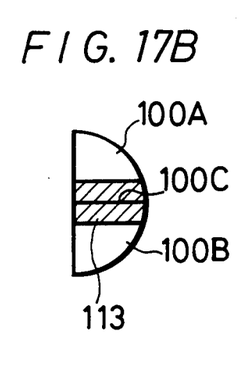

When the optical axis 111A of the lens 111 is perpendicular to the recording surface of the disc 1 as shown in FIG. 14, the real image 113 is focussed on the divided photo detector 100 so as to equally occupy the divided areas 100A and 100B, as shown in FIG. 17B. Thus, the detected outputs from the divided areas 100A and 100B are equal to each other, resulting in no difference therebetween.

Figure 16:
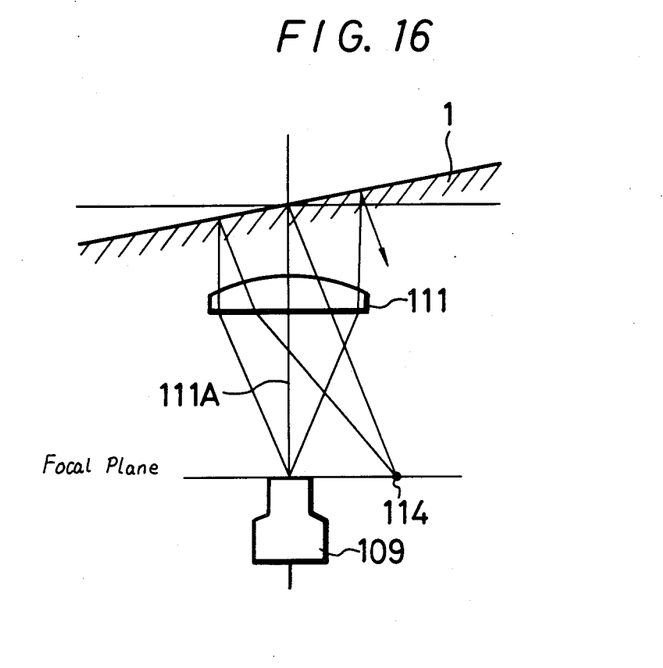
Figure 17C:
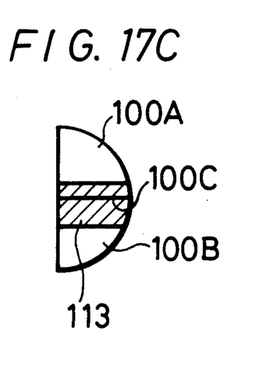

When the optical axis 111A of the lens 111 is not perpendicular to the recording surface of the disc 1 due to the skew of the disc 1 as shown in FIG. 16, the position of the optical image of the light emission diode 109 is displaced in the radial direction of the disc 1 by the tilting of the latter as shown by reference numeral 114 in FIG. 16. As a result, the real image 113 formed on the photo detector 100 occupies a larger amount of the area 100B than of the area 100A as shown in FIG. 17C.

When the disc 1 has a skew opposite to that of FIG. 16, or when the recording surface of the disc 1 is tilted lower its right-hand side as viewed in FIG. 16, the real image 113 formed on the photo detector 100 occupies a larger amount of the area 100A than of the area 100B as shown in FIG. 17A.

On the basis of the difference between the detected outputs from the respective areas 100A and 100B of the photo detector 100, it is possible to detect the direction and amount of the skew of the disc 1.

According to the present invention, the above described skew detector for detecting the skew of the disc 1 is used to control the position of the optical pick up device to always maintain its optical axis perpendicular to the recording surface of the disc 1 as follows.

By way of example, an arrangement will be described in which the first embodiment of the skew detector (FIGS. 3 to 5) is used. In this case, the diffused light source 9 and the light receiving device 13 of the embodiment shown in FIGS. 3 to 5 are moved together with the optical pick up device, while keeping the above described relation to the optical pick up device.

Figure 18:
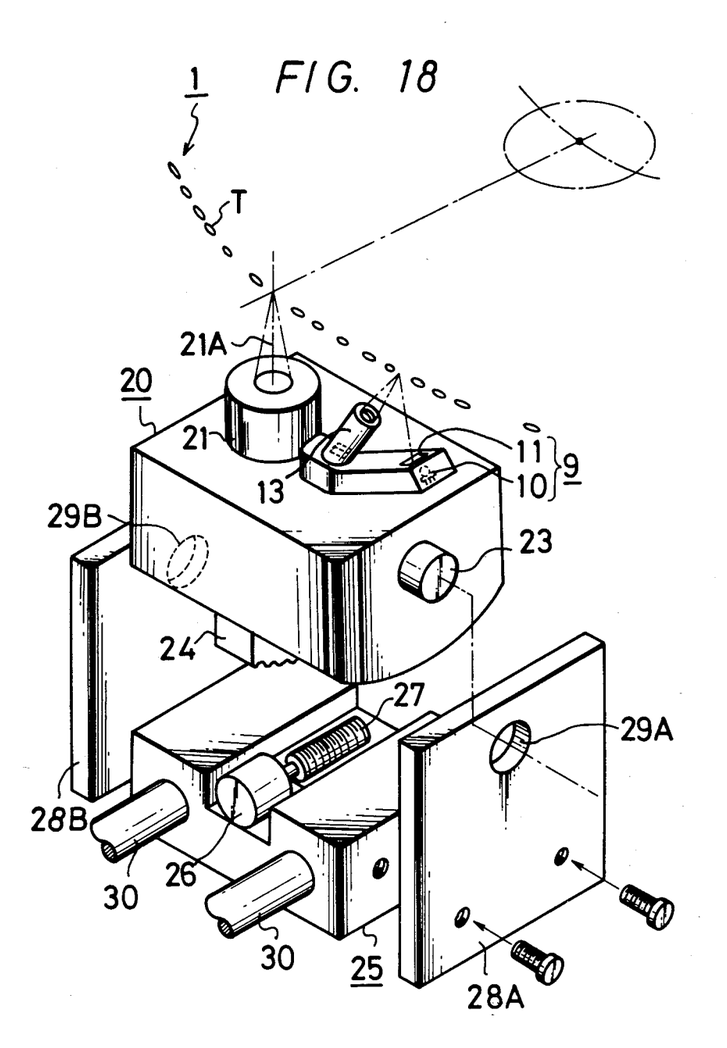
FIG. 18 is a perspective view showing an example of a mechanism which controls an optical axis of an optical pick up device so as to be always maintained perpendicular to a recording surface of a disc.

More particularly, as shown in FIG. 18, reference numeral 20 generally designates an optical block which incorporates therein an optical system of the optical pick up device for detecting information recorded on the disc 1 as pits and the optical system for detecting skew of the disc 1. Focusing servo control and tracking servo control for the optical system of the optical pick up device are carried out by a biaxial optical driving section 21 in the same way as in the prior art. The position of an optical axis 21A of the optical system of the optical pick up device, the light receiving device 13 and the diffused light source 9 are mounted on the optical block 20 in line with the longitudinal direction of a recording track T on the disc 1. Accordingly, the plane including the optical axis of the lens 16 (not shown on FIG. 18) and the optical axis of the diffused light source 9 also includes the optical axis 21A of the optical pick up device.

The optical block 20, as a whole, is supported by a shaft 23 which extends in the direction perpendicular to the radial direction of the disc 1, and about which the optical block 20 can be tilted.

More specifically, in this example, a worm gear segment 24 is mounted on the bottom surface of the optical block 20 and is engaged with a worm 27 rotated by a small motor 26 provided on a support base 25, and both ends of the shaft 23 are rotatably inserted into two apertures 29A, 29B formed through a pair of side plates 28A, 28B. Accordingly, when the worm 27 is rotated by the motor 26, the worm gear 24 is angularly displaced about shaft 23 through an angle corresponding to the rotation of the worm 27 so that the optical block 20 is tilted in the radial direction of the disc 1. Thus, if the motor 26 is controlled in response to the output of the skew detector the optical axis 21A of the optical pick up device can be controlled to be always perpendicular to the recording surface of the disc 1.

Figure 19:
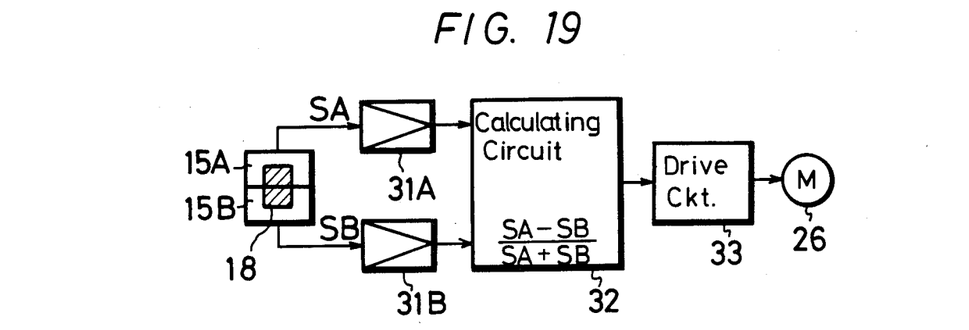
FIG. 19 is a block diagram showing a control system for the mechanism shown in FIG. 18.

FIG. 19 is a block diagram showing an example of a control system for controlling the motor 26. As shown in FIG. 19, detected outputs SA and SB from the divided areas 15A and 15B of the divided photo detector 15, which are proportional to the amounts of light from the image 18 falling on the respective divided areas 15A and 15B, are supplied through amplifiers 31A and 31B to a calculating circuit 32. This calculating circuit 32 may be of a conventional type capable of performing the following calculation $$(SA-SB)/(SA+SB) \qquad (a)$$

The calculated output from the calculating circuit 32 is supplied through a drive circuit 33 to the motor 26. Thus, the motor 26 is controlled in rotation in proportion to the difference $SA-SB$ between the respective detected outputs SA and SB independently of the change in the overall intensity of the image 18 so that the feedback is applied to the motor 26 so as to satisfy the condition, $SA-SB=0$. In other words, the optical axis 21A of the optical pick up device is always maintained perpendicular to the recording surface of the disc 1.

Even if the optical image 18 becomes out of focus due to the change of height of the disc 1, the motor 26 is controlled on the basis of the ratio of the difference $(SA-SB)$ between the detected outputs SA and SB of the respective areas 15A, 15B relative to the total light amount, (SA+SB) of the optical image 18 as expressed by equation (a) so that the motor 26 can be controlled without being affected by the defocused optical image 18, namely, the change of height of the disc 1.

Figures 20, 21:
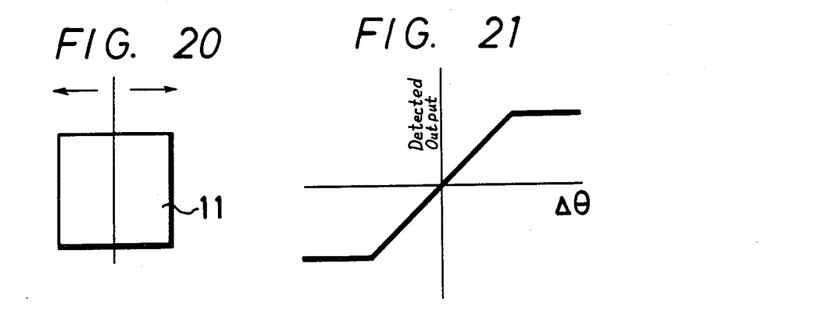
FIGS. 20 and 21, and FIGS. 22 and 23 are diagrams and graphs showing the shapes of images of diffused light sources and the detected output characteristics thereof, respectively.
Figures 22, 23:
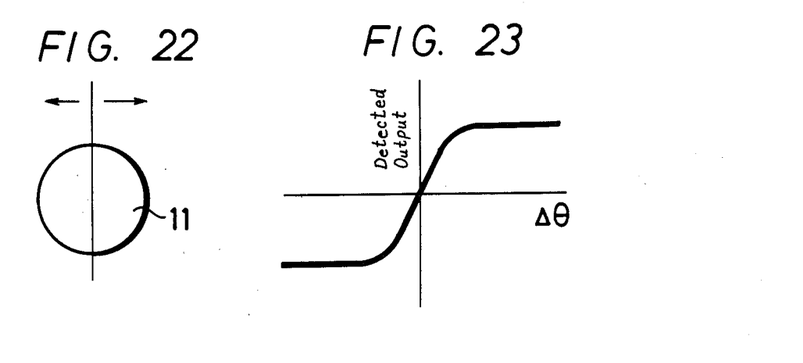

In the above example, it is desirable that the shape of the diffused plate 11 which is substantially focussed on the photo detector 15 as the real image of the diffused light source 9 is rectangular as shown in FIG. 20. The reason for this is that as shown in the graph of FIG. 21, the relation of the skew detected output relative to the skew angle Δθ becomes a straight line. On the contrary, if the shape of the diffused plate 11 is circular as shown in FIG. 22, the relation of the skew detected output relative to the skew angle Δθ becomes a curved line as shown in the graph of FIG. 23 so that it becomes difficult to control the rotation of the motor 26.

In addition, it is needless to say that the diffused light source 9 is not limited to the illustrated light source 9 which uses diffusion plate 11 and lamp 10.

The use of the first embodiment of the skew detector shown in FIGS. 3-5 has been described in connection with FIGS. 18 to 23. However, it will be apparent that the second embodiment of the skew detector shown in FIGS. 10 to 13 can be similarly used with the same or better effects.

As described above, according to the present invention, since the diffused light source is used as the light source, the light emitted from the diffused light source is reflected once on the disc and the real image thereof is formed on the divided photo detector by the condenser lens to thereby detect the skew of the disc, it is possible to provide an optical information reproducing apparatus with a smaller number of parts and at lower cost than those of the prior art which use the laser as the light source for detecting skew of the record disc.

Furthermore, since the light is not a parallel light beam but a diffused light, even the portion of the disc where the content of the information recorded on the disc is changed can never be erroneously detected unintentionally as skew of the disc.

Although preferred embodiments of the invention have been described it will be apparent that many modifications and variations could be effected therein by one skilled in the art without departing from the spirit or scope of the invention as defined by the appended claims.

I claim as my invention:

1. In an optical information reproducing apparatus for reproducing information recorded on a recording surface of a disc-shaped record medium and which comprises an optical pick up device mounted on a tiltable optical block and having an optical axis, a laser beam source for generating a laser beam directed along said optical axis and focused at said recording surface of said record medium and a photo detector for detecting the reflected laser beam from said recording surface and thereby reading the recorded information; a skew error detector mounted on said tiltable optical block for detecting a skew of the record medium; and a skew error corrector controlled by the output of said skew error detector for controlling said optical block so that the optical axis of said pick up device is maintained perpendicular to the recording surface: said skew error detector including light source means providing a diffusely illuminated field, a photo detector divided into a plurality of areas and a lens which is apart from said optical pick up device, said light source means and said divided photo detector being arranged symmetrically with respect to an axis parallel with said optical axis of said optical pick up device, light irradiated from said diffusely illuminated field and reflected from the recording surface being directed to said divided photo detector only through said lens which is dimensioned and positioned to provide a real image of said diffusely illuminated field on said divided photo detector, and the difference between the amounts of light detected by said areas of said divided photo detector represents the skew error output of said skew error detector.

2. An optical information reproducing apparatus according to claim 1, wherein said skew error detector further includes a calculating circuit supplied with the outputs of said areas of said divided photo detector and generating said output of the skew error detector to be proportional to the difference between the outputs divided by the sum of the outputs.

3. An optical information reproducing apparatus according to claim 1, wherein said diffusely illuminated field is substantially rectangularly shaped so that said real image formed on said divided photo detector is substantially rectangular to provide a linear variation of said skew error output relative to displacement of said real image in respect to said divided photo detector.

4. An optical information reproducing apparatus according to claim 1, wherein the light from said diffusely illuminated field passes only through said lens in being irradiated on the recording surface.

5. An optical information reproducing apparatus according to claim 4, wherein said light source means, divided photo detector and lens are mounted in a common housing.

6. An optical information reproducing apparatus according to claim 5; in which said axis with respect to which said light source means and divided photo detector are symmetrically arranged is an optical axis of said lens, and said light source means and divided photo detector are disposed at opposite sides of said optical axis of the lens.

7. An optical information reproducing apparatus according to claim 1; in which an optical axis of said lens is incident on said recording surface at a first angle to said axis parallel with said optical axis of the optical pickup device, and said light source means is disposed so that a direction from the center of said diffusely illuminated field to a point of incidence of said optical axis of the lens on said recording surface is at a second angle equal to said first angle but at the opposite side of said axis parallel with said optical axis of the optical pickup device.

* * * * *